April 7, 1931.  A. J. MUSSELMAN  1,800,184
BRAKE
Filed March 3, 1930
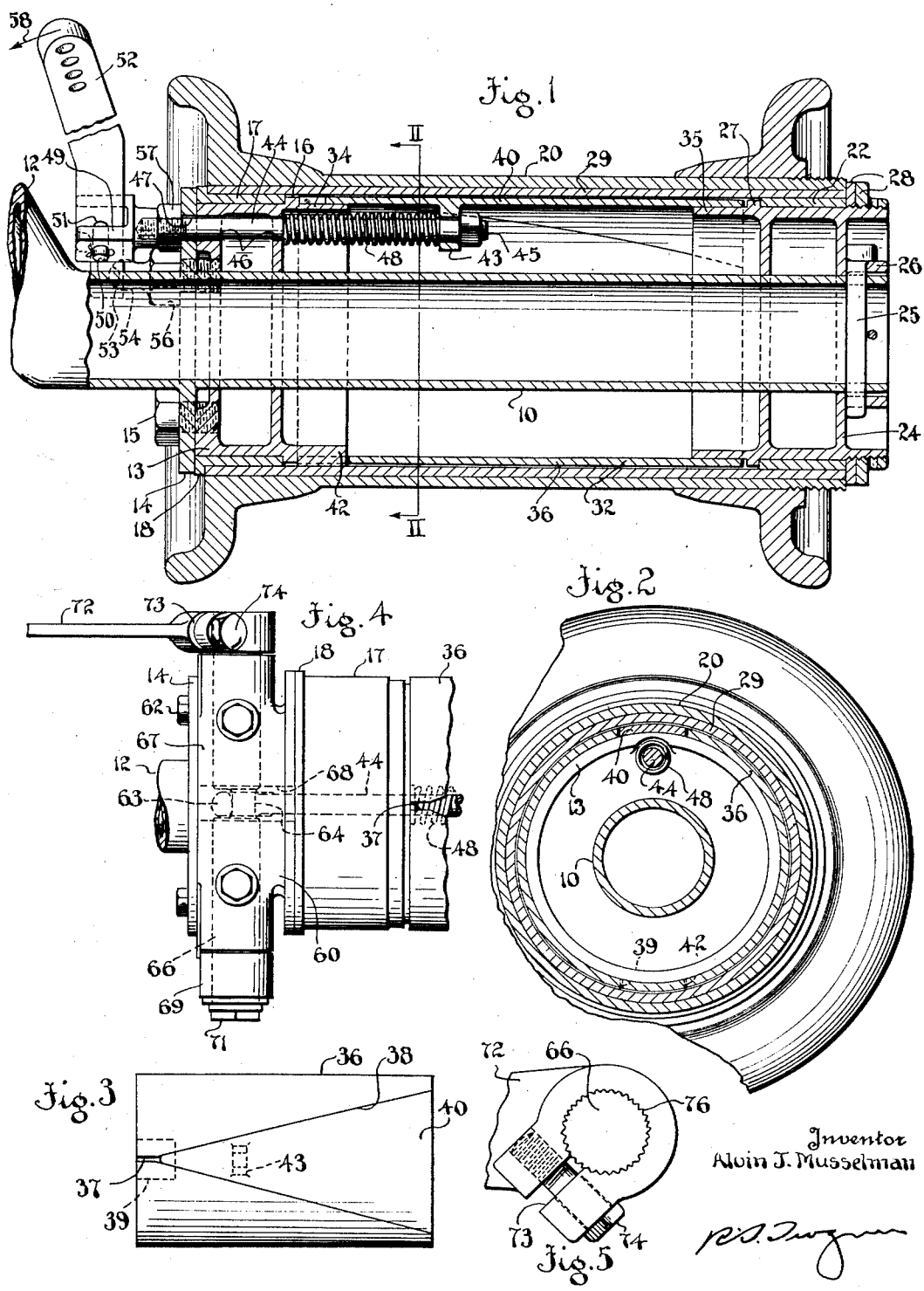
Inventor
Alvin J. Musselman
Attorney Patented Apr. 7, 1931

1,800,184

UNITED STATES PATENT OFFICE

ALVIN J. MUSSELMAN, OF AKRON, OHIO, ASSIGNOR TO THE GOODYEAR TIRE & RUBBER COMPANY, OF AKRON, OHIO, A CORPORATION OF OHIO

BRAKE

Application filed March 3, 1930. Serial No. 432,648.

This invention relates to brakes, and it has particular relation to the type of brakes employed within the hub barrel of aircraft landing gear wheels.

One object of the invention is to provide a brake which is enclosed entirely within the outline of a tire wheel.

Another object of the invention is to provide a simple and efficient mechanism for operating the elements of a brake.

For a better understanding of the invention, reference may now be had to the accompanying drawings, forming a part of the invention, of which Figure 1 is a longitudinal sectional view of a brake constructed according to the invention;

Figure 2 is a cross-sectional view taken substantially along the line II—II of Figure 1;

Figure 3 is a plan view of a cylindrical sleeve including a wedge employed in the brake;

Figure 4 is a fragmentary plan view of a brake similar to that shown by Figure 1, but embodying another form of actuating means, and Figure 5 is a fragmentary, elevational view of an actuating member illustrating, in detail, the connections thereof.

Referring to Figure 1 of the drawing, an axle or shaft 10 of an aircraft landing gear frame 12 is provided at its inner end, that is the end directly adjacent the frame 12, with a brake carrier 13 rigidly secured to a circular flange 14 of the frame by means of bolts 15. A shoulder 16 formed intermediate the ends of the carrier, serves as an abutment for a bearing bushing 17, which is also abutted by the flange 14.

One edge portion of the bushing 17 has an annular flange 18 which serves as an abutment for preventing axial movement of a hub barrel 20, that is rotatably mounted adjacent one of its ends upon the bushing 17.

The other end of the hub barrel is rotatably supported upon a bushing 22 of a bearing carrier 24, that is mounted upon an outer end portion of the axle. A pin 25 extending through a flange 26 of the bearing carrier and through the axle, rigidly secures these elements together. An intermediate annular shoulder 27 of the bearing carrier and rings 28 at the outer end thereof, secure the bushing in its proper position, and the rings also serve as a means for preventing the hub barrel from moving axially.

It will be observed that the diameters of the brake carrier 13 and the bearing carrier 24 are considerably greater than the diameter of the axle and that considerable hollow inner space is provided between the hub barrel and the axle. Also, the shoulders 16 and 27 are materially less in diameter than the inner diameter of the hub barrel. A lining or bushing 29, rigidly secured within, and forming an integral portion of the hub barrel, rests directly upon the bushings 17 and 22 and provides an inner braking surface of the hub barrel.

Opposite ends of a resilient segmental sleeve 32 are supported upon cylindrical end portions 34 and 35 of the carriers 13 and 24, respectively. One segment 36 of the sleeve, which is the major portion, is split adjacent one end, as indicated at 37, and the split merges into an opening 38 of wedge shape extending to the other end thereof. A notch 39 is also formed at one end portion of the sleeve. A wedge 40, forming the other segment of the sleeve, fits snugly into the opening 38 and the two segments 36 and 40 constitute an expansible, cylindrical brake shoe. A lug 42, rigid with the brake carrier 13, normally fits into the notch 39 and anchors the sleeve or brake shoe to the brake carrier.

The inner portion of the wedge 40 is provided with an integral lug 43 through which a rod 44 extends and its movement therein is limited by an adjustable nut or head 45. Openings 46 and 47 in the brake carrier and flange 14, slidably receive the rod and a coil spring 48, normally under compression is confined between the lug 43 and the brake carrier, thus urging the wedge outwardly toward or against the shoulder 27. A clevis 49, screw-threaded upon the end of the rod 44, has a pin 50 extending therethrough and through a slot 51 of an actuating arm 52 that is pivotally mounted thereon. At the end portion of the arm, a spherical recess 53 is formed which receives a spherical head 54 of a bolt 56 that extends through the flange 14, and is threaded into the brake carrier. An adjusting nut 57 on the rod can be turned in order to vary the normal position of the wedge 40 in the opening 38 of the sleeve.

By actuating the outer end of the arm 52 in the direction of the arrow 58, the wedge 40 is drawn inwardly and the sleeve 32 is expanded into braking relation against the inner surface of the hub barrel. By releasing the arm, the spring 48 retracts the wedge and the inherent resiliency of the segment 36 of the sleeve causes it to contract to its normal position.

In the form of the invention shown by Figure 4, a brake carrier 60 is rigidly mounted, as indicated at 62, upon the flange 14 that is integral with the axle 10 of the landing gear frame 12. The end of the rod 44 opposite the nut 45, in this construction, has been altered and a hook 63 formed thereon engages an eccentric or crank pin 64 that is integral with an intermediate portion of a crank shaft 66. Opposite end portions of the crank shaft are mounted in a cylindrical bearing housing 67 that is integral with the brake carrier 60 and has a central hollow portion 68 for receiving the hook 63. It will be observed that the housing is arranged transversely of the axis of the axle and the brake carrier, and that the hollow portion 68 communicates with the adjacent opening 46. One end of the crank shaft is provided with a spacer 69 and conventional securing means 71, while the other end receives an actuating arm 72 that is split, as indicated at 73, and clamped thereon by tightening a bolt 74 threaded into the arm through the split portion. Cooperating serrated portions 76 prevent relative rotation of the shaft 66 and the arm 72. Thus by tightening bolt 74 the split portions of the arm are drawn tightly together about the shaft 92. The operation of this form of actuating device is substantially the same as that described with reference to Figure 1.

Although only the preferred forms of the invention have been disclosed and described in detail, it will be apparent to those skilled in the art that the invention is not so limited but that various modifications may be made therein without departing from the spirit of the invention or from the scope of the appended claims.

What I claim is:

1. A brake comprising annular members having an axle supporting them rigidly, a hub barrel mounted upon the members, a sleeve divided into wedging sections supported by said members within the hub barrel, an element extending through one of the annular members, means connecting the element to one of the sections, and means for drawing the element axially of the sleeve for wedging the sections and thereby expanding them into braking engagement with the hub barrel.

2. A brake comprising annular members having an axle rigidly supporting them, a hub barrel mounted upon the members, a split sleeve having an opening of wedge shape therein, a wedge normally fitting the opening of the sleeve, an elongate member secured to the wedge and extending through one of the annular members and a lever mechanism secured to the elongate member for actuating the wedge.

3. A brake comprising annular members having an axle rigidly supporting them, a hub barrel rotatably mounted upon the members, a resilient sleeve including a wedge-like section disposed within the hub barrel, an elongate member secured to the section and extending axially beyond one of the annular members, an actuating device having means for connecting it to the elongate member, and a bearing upon one of the annular members for engaging a portion of the device, the bearing providing a fulcrum for operating the actuating device about an axis transversely disposed with respect to the axis of the axle.

4. A brake comprising a pair of annular members having an axle rigidly supporting them, a hub barrel having its opposite end portions rotatably mounted upon the members, a cylindrical sleeve including a wedge-like section disposed within the hub barrel, an elongate member secured to the section and extending axially through one of the annular members, an arm pivotally connected to the elongate member and a bearing on one of the annular members providing a fulcrum for the arm about an axis transversely of the axis of the axle.

5. A brake comprising a pair of annular members having an axle rigidly supporting them, one of said members having an integral cylndrical bearing housing disposed transversely of the axis of the axle, a hub barrel having its opposite end portions rotatably mounted upon the members, a cylindrical sleeve including a wedge-like section disposed within the hub barrel and centered between the annular members, an elongate member secured to the section and extending axially through one of the annular members, a resilient member disposed between the section and one of the annular members for retracting the section, a crank shaft mounted in the bearing housing on an axis transversely of the axis of the axle, and means for connecting the elongate member to the crank shaft.

In witness whereof, I have hereunto signed my name.

Signed at Akron, in the county of Summit and State of Ohio, U. S. A., this 28th day of February, 1930.

ALVIN J. MUSSELMAN.